United States Patent [19]
Saito et al.

[11] Patent Number: 5,935,529
[45] Date of Patent: Aug. 10, 1999

[54] EXHAUST GAS CLEANER AND METHOD FOR CLEANING EXHAUST GAS

[75] Inventors: Mika Saito; Kiyohide Yoshida, both of Kumagaya, Japan

[73] Assignee: Kabushiki Kaisha Riken, Tokyo, Japan

[21] Appl. No.: 08/706,635

[22] Filed: Sep. 6, 1996

[30] Foreign Application Priority Data

| Sep. 8, 1995 | [JP] | Japan | 7-256724 |
| Sep. 21, 1995 | [JP] | Japan | 7-267686 |
| Oct. 25, 1995 | [JP] | Japan | 7-302000 |
| Nov. 7, 1995 | [JP] | Japan | 7-313637 |

[51] Int. Cl.$^6$ .................................................. B01D 53/34
[52] U.S. Cl. .......................... 422/177; 422/171; 502/439; 502/330; 502/331; 502/344; 502/345; 502/347
[58] Field of Search .................... 422/171, 177, 422/180; 502/439, 302–303, 74, 66, 330–331, 344–348

[56] References Cited

U.S. PATENT DOCUMENTS

| 5,049,364 | 9/1991 | Yoshimoto et al. | 502/326 |
| 5,208,202 | 5/1993 | Muramatsu et al. | 502/302 |
| 5,336,651 | 8/1994 | Yoshimoto et al. | 502/74 |
| 5,589,432 | 12/1996 | Yoshida et al. | 502/325 |
| 5,658,542 | 8/1997 | Yoshida et al. | 423/213.2 |
| 5,658,543 | 8/1997 | Yoshida et al. | 423/213.2 |
| 5,670,444 | 9/1997 | Yoshida et al. | 502/331 |

FOREIGN PATENT DOCUMENTS

| 362960 | 11/1990 | European Pat. Off. . |
| 0577438 | 1/1994 | European Pat. Off. . |
| 0605251 | 7/1994 | European Pat. Off. . |
| 0640380 | 3/1995 | European Pat. Off. . |
| 0661089 | 7/1995 | European Pat. Off. . |
| 0682975 | 11/1995 | European Pat. Off. . |
| 63-100919 | 5/1988 | Japan . |
| 63-283727 | 11/1988 | Japan . |
| 62-291258 | 5/1989 | Japan . |
| 92-281844 | 10/1992 | Japan . |
| 3-153891 | 12/1992 | Japan . |

*Primary Examiner*—Hien Tran
*Attorney, Agent, or Firm*—Browdy & Neimark

[57] ABSTRACT

An exhaust gas cleaner for removing nitrogen oxides by reduction from an exhaust gas containing nitrogen oxides, sulfur oxides, moisture, unburned or partially burned components and oxygen, a content of oxygen in the exhaust gas being larger than a stoichiometric amount required for completely oxidizing or burning the unburned or partially burned components, wherein the exhaust gas cleaner consists essentially of a first catalyst consisting essentially of a first porous inorganic oxide carrying at least one silver component, and at least one transition metal component selected from the group consisting of copper, iron, cobalt, nickel and compounds thereof; and a second catalyst selected from the group consisting of (a) a catalyst consisting essentially of a porous titania, (b) a catalyst consisting essentially of a second porous inorganic oxide carrying a titanium component, (c) a catalyst consisting essentially of the second porous inorganic oxide carrying at least one first component selected from the group consisting of copper, nickel, silver, cobalt and compounds thereof, at least one second component selected from the group consisting of titanium, zirconium and compounds thereof, and at least one third component selected from the group consisting of alkali metal elements and rare earth elements, and (d) a catalyst consisting essentially of the second porous inorganic oxide carrying a titanium component and at least one noble metal component selected from the group consisting of platinum, palladium, ruthenium, rhodium, iridium and gold.

17 Claims, No Drawings

EXHAUST GAS CLEANER AND METHOD FOR CLEANING EXHAUST GAS

BACKGROUND OF THE INVENTION

The present invention relates to an exhaust gas cleaner for effectively removing nitrogen oxides by reduction from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than the stoichiometric oxygen amount for completely oxidizing or burning unburned or partially burned components such as carbon monoxide, hydrogen, hydrocarbons in the exhaust gas to carbon dioxide and water. The term "nitrogen oxides" (NOx) means nitrogen monoxide and/or nitrogen dioxide.

The nitrogen oxides are one of causes of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is introduced into an exhaust gas, whereby nitrogen oxides in the exhaust gas are catalytically and selectively reduced (selective catalytic reduction).

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen, carbon monoxide and hydrocarbons (non-selective catalytic reduction). However, this method requires a larger amount of the reducing agent than its stoichiometric amount relative to oxygen in the exhaust gas to carry out effective removal of NOx. Accordingly, this method is effective only for the exhaust gas having a relatively low oxygen concentration, which is generated by burning nearly at a theoretical air-fuel ratio.

There have been proposed methods of reducing nitrogen oxides by adding to an exhaust gas a reducing agent in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735). Further, Japanese Patent Laid-Open No. 4-354536 has disclosed a method in which nitrogen oxides are reduced on a catalyst comprising γ-alumina carrying alkaline earth metal and/or silver by adding to an exhaust gas a gaseous hydrocarbon.

However, these methods are effective only in a narrow temperature range, in particular, not practical at an exhaust gas temperature lower than about 400° C. Also, their efficiency of removing nitrogen oxides is extremely low in the case of an actual exhaust gas because it contains moisture and sulfur dioxide.

OBJECT AND SUMMARY OF THE INVENTION

Accordingly, an object of the present invention is to provide an exhaust gas cleaner and a method capable of efficiently removing nitrogen oxides by reduction from an exhaust gas containing nitrogen oxides, sulfur oxides, moisture and oxygen in an amount larger than the stoichiometric oxygen amount for completely oxidizing or burning unburned or partially burned components such as carbon monoxide, hydrogen, hydrocarbons, etc., which is discharged from stationary combustion apparatuses, gasoline engines and diesel engines operated under oxygen excess conditions (lean-burn conditions).

As a result of the intense research in view of the above objects, the inventors have found that when an exhaust gas externally added with a reducing agent such as hydrocarbons and oxygen-containing organic compounds is brought into contact with a first catalyst carrying silver and optionally particular transition metal, nitrogen-containing compounds such as alkyl nitrites, ammonia, etc. and aldehydes are by-produced on the first catalyst, and that when the exhaust gas is subsequently brought into contact with a second catalyst of titania or a second catalyst carrying titanium, zirconium, copper, platinum, etc., the nitrogen oxides are effectively reduced in the presence of the by-products even when the raw exhaust gas from engines or combustion apparatuses contains sulfur oxides and moisture. The present invention has been completed based on these findings.

Thus, in a first aspect of the present invention, there is provided an exhaust gas cleaner for removing nitrogen oxides by reduction from an exhaust gas containing nitrogen oxides, sulfur oxides, moisture, unburned or partially burned components and oxygen, a content of oxygen in the exhaust gas being larger than a stoichiometric amount required for completely oxidizing or burning the unburned or partially burned components, wherein the exhaust gas cleaner consists essentially of (1) a first catalyst consisting essentially of a first porous inorganic oxide carrying at least one silver component selected from the group consisting of silver and silver compounds, and optionally at least one transition metal component selected from the group consisting of copper, iron, cobalt, nickel and compounds thereof; and (2) a second catalyst selected from the group consisting of (a) a catalyst consisting essentially of a porous titania, (b) a catalyst consisting essentially of a second porous inorganic oxide carrying at least one titanium component selected from the group consisting of titanium and titanium compounds, (c) a catalyst consisting essentially of the second porous inorganic oxide carrying at least one first component selected from the group consisting of copper, nickel, silver, cobalt and compounds thereof, at least one second component selected from the group consisting of titanium, zirconium and compounds thereof, and optionally at least one third component selected from the group consisting of alkali metal elements and rare earth elements, and (d) a catalyst consisting essentially of the second porous inorganic oxide carrying at least one titanium component selected from the group consisting of titanium and titanium compounds and at least one noble metal component selected from the group consisting of platinum, palladium, ruthenium, rhodium, iridium and gold.

In a second aspect of the present invention, there is provided a method for removing nitrogen oxides by reduction from an exhaust gas containing nitrogen oxides, sulfur oxides, moisture, unburned or partially burned components and oxygen, a content of oxygen in the exhaust gas being larger than a stoichiometric amount required for completely oxidizing or burning the unburned or partially burned components, which comprises (1) disposing an exhaust gas cleaner as defined above in a flow path of the exhaust gas; (2) introducing into the exhaust gas at least one reducing agent selected from the group consisting of hydrocarbons, oxygen-containing organic compounds and a hydrocarbon fuel containing at least one of the hydrocarbons and oxygen-containing organic compounds on an upstream side of the exhaust gas cleaner; and (3) passing the resulting exhaust gas containing the reducing agent through the exhaust gas, thereby bringing the exhaust gas into successive contact with the first catalyst and the second catalyst at 150–650° C. in the presence of the reducing agent to remove the nitrogen oxides by reduction.

DETAILED DESCRIPTION OF THE INVENTION

The present invention will be described below more in detail.

[1] First Catalyst

The first catalyst consists essentially of a porous inorganic oxide carrying, as the essential component, at least one silver component selected from the group consisting of silver and silver compounds, and as an optional component at least one transition metal component selected from the group consisting of copper, iron, cobalt, nickel and compounds thereof. The first catalyst is positioned at an exhaust gas inlet side of the exhaust gas cleaner and catalyzes the reduction of the nitrogen oxides over a wide temperature range of the exhaust gas.

The porous inorganic oxide for the first catalyst may include alumina, alumina composite oxides and alumina mixed oxides. The alumina composite oxides include composite oxides of alumina and at least one oxide selected from the group consisting of titania, silica, zirconia, oxides of zinc, oxides of tin, oxides of magnesium and zeolite. The alumina mixed oxides may be a mixture of alumina mechanically blended with at least one oxide selected from the group consisting of titania, silica, zirconia, oxides of zinc, oxides of tin, oxides of magnesium and zeolite. The use of alumina alone, the alumina composite oxide or the alumina mixed oxide enhances the heat resistance and durability of the first catalyst.

The alumina content in the alumina composite oxides and the alumina mixed oxides is preferably 20 weight % or more, more preferably 50 weight % or more based on the total amount of the composite oxide or the mixed oxide.

The specific surface area of the porous inorganic oxide is preferably 10 $m^2/g$ or more, more preferably 30 $m^2/g$ or more. When the specific surface area is smaller than 10 $m^2/g$, the silver component is not dispersed sufficiently throughout the porous inorganic oxide, failing to remove nitrogen oxides efficiently.

The silver compound may include silver oxides, silver halides, silver sulfate, silver phosphate, etc., and preferably silver oxides, silver chloride and silver sulfate, more preferably silver oxides and silver chloride. The total amount of the silver component carried on the porous inorganic oxide is 0.2–15 weight %, preferably 0.5–12 weight % (silver element basis) based on the amount of porous inorganic oxide. When the amount is less than 0.2 weight %, the removal ratio of the nitrogen oxides is low. On the other hand, an amount exceeding 15 weight % also decreases the NOx removal ratio because the externally added reducing agent such as hydrocarbons and oxygen-containing organic compounds is likely to be predominantly burned without reducing the nitrogen oxides.

The optional transition metal component for the first catalyst is at least one selected from the group consisting of copper, iron, cobalt, nickel and compounds thereof such as oxides, halides, sulfates and phosphates. The total amount of the transition metal component to be carried on the porous inorganic oxide is 2 weight % or less, preferably 1.5 weight % or less (metal element basis) based on the amount of the porous inorganic oxide. The lower limit of the amount of the transition metal component when used is preferably 0.001 weight %, more preferably 0.1 weight % (metal element basis) based on the amount of the porous inorganic oxide.

The silver component may be carried on the porous inorganic oxide by known methods such as an impregnation method, a precipitation method, etc. For example, silver may be carried by immersing the porous inorganic oxide into an aqueous or ammoniac aqueous solution of silver nitrate, silver carbonate, etc. Silver sulfate may be carried by immersing the porous inorganic oxide in a solution of silver sulfate in aqueous nitric acid or by immersing the porous inorganic oxide in a solution of ammonium sulfate after immersing in an aqueous solution of silver nitrate. Silver phosphate may be carried by immersing the porous inorganic oxide in an aqueous solution of silver nitrate while adding little by little phosphoric acid or ammonium phosphate under stirring. Silver halide may be carried by immersing the porous inorganic oxide impregnated with an aqueous solution of silver nitrate, etc. in an aqueous solution of ammonium halide to convert the silver nitrate on the porous inorganic oxide into silver halide precipitation. Silver halide may be also carried by directly depositing silver halide on the porous inorganic oxide by precipitating silver halide from the reaction of silver nitrate and ammonium halide.

The porous inorganic oxide carrying each silver component is dried at about 50–150° C., preferably at about 70° C., and then the dried product is subjected to calcination by heating it stepwise from about 100° C. to about 600° C. in air, nitrogen gas stream containing oxygen or hydrogen gas stream. When calcined in hydrogen gas stream, the calcined product is preferred to be further subjected to oxidation treatment at 300–650° C. During the oxidation treatment to 650° C., some silver component may be oxidatively decomposed. Although the detailed mechanism has not been proved, it has been found that such an oxidatively decomposed component enhances the NOx removing efficiency.

The transition metal component may be carried on the porous inorganic oxide basically in the same manner as described above.

[2] Second Catalyst

The second catalyst consists essentially of (a) a porous titania, (b) a porous inorganic oxide carrying at least one titanium component selected from the group consisting of titanium and titanium compounds, (c) a porous inorganic oxide carrying at least one first component selected from the group consisting of copper, nickel, silver, cobalt and compounds thereof, at least one second component selected from the group consisting of titanium, zirconium and compounds thereof, and optionally at least one third component selected from the group consisting of alkali metal elements and rare earth elements, or (d) a porous inorganic oxide carrying at least one titanium component selected from the group consisting of titanium and titanium compounds and at least one noble metal component selected from the group consisting of platinum, palladium, ruthenium, rhodium, iridium and gold.

[2-a] Second catalyst (a)

The second catalyst (a) consists essentially of a porous titania alone preferably having a specific surface area of 10 m²/g or more. The porous titania is not specifically restricted in the modification type and the anatase-type and rutile-type are preferable. The porous titania may be produced by known methods.

[2-b] Second catalyst (b)

The porous inorganic oxide for the second catalyst (b) may be at least one oxide selected from the group consisting of alumina, titania, silica, zirconia, zinc oxides, tin oxides, magnesium oxides and zeolite. Zeolite may include ferrierite, mordenite, ZSM-5, etc. The porous inorganic oxide is preferred to have a specific surface area of 10 m²/g or more.

The titanium compounds to be carried on the above porous inorganic oxide are not specifically restricted, and titania (titanium oxide) of anatase-type or rutile-type is preferable. The specific surface area of the titanium oxides is preferably 10 m²/g or more.

Since the porous inorganic oxide includes titania, the second catalyst (b) may include titania carrying the titanium oxides. However, it has been found that the NOx removing efficiency of titania alone is further improved by coating the titanium oxides on titania as the support.

The amount of the titanium component to be carried on the porous inorganic oxide is 0.1–50 weight %, preferably 0.5–30 weight % (titanium basis) based on the amount of porous inorganic oxide. When the amount is less than 0.1 weight %, the removal ratio of the nitrogen oxides is low. On the other hand, an amount exceeding 50 weight % also decreases the NOx removal ratio because the externally added reducing agent such as hydrocarbons and oxygen-containing organic compounds is likely to be predominantly burned without being used for reducing the nitrogen oxides.

The titanium component is carried on the porous inorganic oxide by mixing the porous inorganic oxide with a solution or slurry of a titanium compound, drying and calcining. As the solution of a titanium compound, are exemplified a solution of titanium alkoxide such as titanium isopropoxide, titanium tetraisopropoxide, etc. in an alcohol such as ethanol, 2-propanol, etc., and an aqueous solution of a chloride of titanium. As the slurry of a titanium compound, a homogeneous mixture of a titania sol and deionized water may be used. After mixing the porous inorganic oxide with a solution or slurry of a titanium compound, the resultant porous inorganic oxide is dried at about 50–150° C., preferably at about 70° C., and then subjected to calcination by heated stepwise from about 100° C. to about 600° C. in air, nitrogen gas stream containing oxygen or hydrogen gas stream. When the calcination is conducted in hydrogen gas stream, the calcined product is preferred to be subjected to oxidation treatment at 300–650° C.

[2-c] Second catalyst (c)

The same porous inorganic oxide for the second catalyst (b) may be used for the carrier of the second catalyst (c).

The first essential component for the second catalyst (c) is at least one component selected from the group consisting of copper, nickel, silver and cobalt. These catalytic components may be present in the form of element and compound such as oxides, halides, sulfates and phosphates. The total amount of the first component carried on the porous inorganic oxide is 0.5–30 weight %, preferably 1–20 weight % (metal element basis) based on the amount of the porous inorganic oxide. The first component may be carried on the porous inorganic oxide in the same manner as described above.

The second essential component is titanium and/or zirconium, both of which may be present in the form of element and compound such as oxides. Titanium and/or oxides thereof are preferable. The porous inorganic oxide for the second catalyst (c) includes titania and zirconia. However, by coating titanium and/or titanium oxides on titania as the support or coating zirconium and/or zirconium oxides on zirconia as the support, the activity of the catalyst may be further improved as compared with using titania or zirconia as the support without such coating. The total amount of the second component to be carried on the porous inorganic oxide is 0.1–50 weight %, preferably 0.1–20 weight % (metal element basis) based on the amount of the porous inorganic oxide. Titanium and/or titanium oxides may be carried on the porous inorganic oxide in the same manner as described above. Zirconium and/or zirconium oxides may be carried on the porous inorganic oxide in the same manner as in carrying titanium and/or titanium oxides except for using an aqueous solution of zirconium alkoxide or zirconium nitrate.

The third component is optional and at least one selected from the group consisting of alkali metal elements and rare earth elements. The third component improves the durability of the catalyst and enhances the NOx reducing efficiency of hydrocarbon. Of the alkali metal elements, cesium, sodium and potassium are preferable. Lanthanum, cerium and neodymium are preferred rare earth elements, and Misch metal which is a mixture of rare earth elements is also suitably used. The total amount of the third component to be carried on porous inorganic oxide is 5 weight % or less, preferably 0.2–3 weight % (metal element basis) based on the porous inorganic oxide. The carried amount of each of the alkali metal elements and the rare earth elements is preferably 2 weight % or less, more preferably 0.1–1.5 weight % (metal element basis) based on the porous inorganic oxide. The alkali metal elements and rare earth elements may be carried on the porous inorganic oxide in the same manner as in carrying transition metals such as copper, nickel, silver and cobalt.

[2-d] Second catalyst (d)

The same porous inorganic oxide for the second catalyst (b) may be used for the carrier of the second catalyst (d).

The titanium component for the second catalyst (d) is the same as those used in the second catalyst (b), and carried in an amount of 0.1–50 weight %, preferably 0.1–20 weight % (titanium basis) based on the porous inorganic oxide. Like the second catalyst (c), the second catalyst (d) also includes titania as the support carrying titanium oxides. However, by coating titanium oxides on titania as the support, the activity of the catalyst may be further improved as compared with using titania alone as the support without coating titanium oxides.

Of the noble metal components, preferred are platinum, palladium and gold. The total amount of the noble metal component to be carried on the porous inorganic oxide is 0.1 weight % or less, preferably 0.01–0.1 weight % (metal element basis) based on the porous inorganic oxide. The noble metal component may be carried on the porous inorganic oxide in the same manner as in carrying the transition metal by using an aqueous solution of salts of noble metal such as carbonates, nitrates, acetates, sulfates, halides and phosphates, hexachloromatal acid, dinitrodiammine complex of noble metal, etc.

In the above production method for the second catalyst (b) to (d), when zeolite is used as the porous inorganic oxide, the catalytic component may be preferably carried on zeolite by impregnation method or ion-exchange method.

By using the second catalyst in combination with the first catalyst, the nitrogen oxides is effectively reduced to nitrogen in the presence of the nitrogen-containing compound such as alkyl nitrites, ammonia, etc. and aldehydes both being by-produced on the first catalyst. Further, the partial oxidization of the reducing agent such as alcohol to carbon monoxide can be effectively prevented, in particular, by using the second catalyst (d).

[3] Exhaust Gas Cleaner

The exhaust gas cleaner is formed by combining the first and second catalysts so that the first catalyst is positioned at the exhaust gas inlet side and the second catalyst at the exhaust gas outlet side of the exhaust gas cleaner. The first and second catalyst are in contact with each other or separated from each other.

The weight ratio of the first catalyst and the second catalyst is 1:10 to 20:1, preferably 1:5 to 10:1.

A first preferred form of the exhaust gas cleaner consisting essentially of a cleaner substrate coated thereon with each of the first and second catalysts. The cleaner substrate may be made of a porous, heat-resistant ceramic having a large specific surface area such as cordierite, mullite, alumina and composite oxides, or a known metal material.

The shape and size of the cleaner substrate may be changed depending on applications. The cleaner substrate may be of a three-dimensional structure such as a honeycomb, a foam, a refractory fiber assembly, etc. Further, the cleaner substrate may be of granules or pellets.

Each of the catalysts may be coated on different portions of the same cleaner substrate, or each catalyst may be coated on separate cleaner substrates, and thereafter, fabricated into an exhaust gas cleaner.

The catalyst may be coated on the cleaner substrate by a wash-coating method, a powder method, etc. Alternatively, a cleaner substrate coated with a catalyst on its surface may be produced by coating a porous inorganic oxide on the cleaner substrate by a wash-coating method, sol-gel method, etc. and then carrying the active component on the porous inorganic oxide on the cleaner substrate by known impregnation method, ion-exchange method, etc.

The thickness of each catalyst coated on the cleaner substrate is preferably up to 300 $\mu$m, though it is usually restricted by the difference in a thermal expansion coefficients between the catalyst and the cleaner substrate. With such thickness, it is possible to prevent the cleaner from being broken by a thermal shock, etc. during NOx-removing operations.

The amount of the respective catalyst coated onto the surface of the cleaner substrate is preferably 20–300 g/liter, more preferably 50–200 g/liter based on the cleaner substrate. When the amount is less than 20 g/liter, a sufficient removal ratio of the nitrogen oxides cannot be achieved. On the other hand, an amount more than 300 g/liter gives no additional improvement in removal efficiency, but results in a higher loss of pressure.

A second preferred form of the exhaust gas cleaner is obtained by combining the first and second catalysts each being in the form of pellet, granulate, powder, foam, honeycomb or plate. Alternatively, such a second preferred form may be obtained by forming powdery catalysts into honeycomb, foam, plate, pellet or granulate and then fabricating the thus formed catalysts into an exhaust gas cleaner.

When the noxious air pollutants other than NOx, such as hydrocarbons and carbon monoxide, are intended to be removed, a third catalyst may be used to treat the effluent from the second catalyst. For this purpose, a catalyst consisting essentially of a porous inorganic oxide carrying at least one noble metal selected from the group consisting of platinum, palladium, ruthenium, rhodium, iridium and gold in an amount of 0.01–5 weight % (metal element basis) based on the porous inorganic oxide, and optionally carrying at least one oxide of transition metal selected from the group consisting of tungsten, vanadium, molybdenum, manganese, niobium and tantalum in an amount of 0.2–10 weight % (metal element basis) based on the porous inorganic oxide. As the porous inorganic oxide, exemplified are alumina, titania, silica, zirconia, zinc oxides, tin oxides, magnesium oxides and zeolite. When treating the exhaust gas from diesel engines, the third catalyst containing both the noble metal component and the transition metal component is preferred because the oxidation of sulfur dioxide in the diesel exhaust gas can be prevented.

[4] NOx Removing Method

With the exhaust gas cleaner described above, NOx can be effectively removed even from exhaust gas containing about 10% moisture and up to about 300 ppm of sulfur oxides, both by volume, at a wide temperature range of 150–650° C.

The raw exhaust gas usually contains residual hydrocarbons such as ethylene, propylene, etc. to some extent. Since the amounts of residual hydrocarbons are not sufficient to reduce all nitrogen oxides in the exhaust gas, at least one reducing agent should be externally introduced into the raw exhaust gas. A site for introducing the reducing agent is an upstream side of the exhaust gas cleaner.

The reducing agent to be added to the exhaust gas may include hydrocarbons and oxygen-containing organic compounds which may be used alone or in combination. A hydrocarbon fuel such as gasoline, light oil, kerosene, etc. containing at least one hydrocarbons and oxygen-containing organic compounds may be also usable as the reducing agent. Preferred reducing agent is the oxygen-containing organic compound and the hydrocarbon fuel containing it.

The hydrocarbons to be added as the reducing agent are alkanes, alkenes and alkynes which may be gaseous or liquid at the normal state (25° C., 1 atm). The alkanes and alkenes are preferred to have 2 or more carbon atoms. The liquid hydrocarbons at the normal state may be light oil, cetane, heptane, kerosene, gasoline, etc., and those having a boiling point of 50–350° C. are preferable. The oxygen-containing organic compound to be added as the reducing agent is preferred to have at least two carbon atoms and may include alcohols such as ethanol, isopropyl alcohol, etc. and aldehydes.

The weight ratio (the reducing agent/nitrogen oxides in exhaust gas) is preferably 0.1–5. When the weight ratio is less than 0.1, the removal ratio of nitrogen oxides is not improved. On the other hand, when the weight ratio is more than 5, fuel efficiency is low. It is important in the present invention that the exhaust gas is brought into contact with the first catalyst under oxygen excess conditions. To ensure this, the reducing agent should be added in an amount keeping the oxygen content in the exhaust gas added with the reducing agent larger than the stoichiometric oxygen amount for completely oxidizing or burning the oxidizable or combustible components such as carbon monoxide, hydrogen, hydrocarbons, oxygen-containing organic compound, etc. in the exhaust gas to carbon dioxide and water. The oxygen content in the exhaust gas added with the reducing agent is preferably 1–5000 times, more preferably 1.5–5000 times, particularly preferably 2–5000 times by volume, the stoichiometric amount.

To efficiently proceed the reduction of nitrogen oxides with the reducing agent and the by-product formed on the first catalyst, the space velocity of the exhaust gas passing through each of the catalysts may be controlled to 150,000 $h^{-1}$ or less, preferably 100,000 $h^{-1}$ or less for the first catalyst, 200,000 $h^{-1}$ or less, preferably 150,000 $h^{-1}$ or less for the second catalyst, and 200,000 $h^{-1}$ or less, preferably 150,000 $h^{-1}$ or less for the third catalyst if used.

The exhaust gas passing through the exhaust gas cleaner where the reducing agent is reacted with the nitrogen oxides is kept at 150–650° C., preferably 200–600° C. and more preferably 350–550° C. When the temperature is lower than 150° C., the reduction of nitrogen oxides by the reducing agent cannot be sufficiently carried out. On the other hand, when the temperature is higher than 650° C., the reducing agent is burned before reacts with the nitrogen oxides, failing to reduce the nitrogen oxides effectively.

The present invention will be further described while referring to the following Examples which should be considered to illustrate various preferred embodiments of the present invention. In the following Examples and Comparative Examples, the weight percentages of the catalytic components are described in terms of metal element basis.

EXAMPLE 1

10 g of commercially available γ-alumina powder (specific surface area: 200 m$^2$/g) were immersed in an aqueous solution of silver nitrate and then dried at 80° C. for 3 hours. The dried powder was heated stepwise from 100° C. to 600° C. and calcined there for 3 hours to obtain a first catalyst carrying 4 weight % of silver based on γ-alumina. A slurry containing 0.52 g of the first catalyst was coated on a commercially available honeycomb cordierite filter (diameter: 20 mm, length: 16.6 mm, 200 cells/in$^2$), dried at 80° C. for 3 hours in air and then heated stepwise from 100° C. to 600° C. to be calcined at 600° C. for 3 hours to prepare a first cleaner part coated with the first catalyst.

Separately, after coating a slurry containing 0.26 g of powdery titania (specific surface area: 50 m$^2$/g, manufactured by Degussa Co. Ltd.) on a commercially available honeycomb cordierite filter (diameter: 20 mm, length: 8.3 mm, 200 cells/in$^2$), the filter was subjected to the same treatment as above to produce a second cleaner part coated with a second catalyst.

An exhaust gas cleaner consisting of the first cleaner part on the inlet side and the second cleaner part on the outlet side was disposed in a reactor tube. Next, a test gas having the composition shown in Table 1 was caused to pass through the reactor pipe at a flow rate of 4.35 liters per minute (the normal state: 25° C., 1 atm) while maintaining the test gas in the reactor tube at each temperature of 350, 400, 450, 500, 550 and 600° C. The apparent space velocity on each of the first and second catalysts was about 50,000 h$^{-1}$ and about 100,000 h$^{-1}$, respectively.

The concentrations of nitrogen oxides in the exhaust gas before and after passing through the exhaust gas cleaner were measured by a chemiluminescence analyzer. The NOx removal ratio was calculated from the equation of (NOx$_{(in)}$−NOx$_{(out)}$)/NOx$_{(in)}$×100. The results are shown in Table 2.

TABLE 1

| Component | Concentration (by volume, dry basis) |
| --- | --- |
| Nitrogen monoxide | 800 ppm |
| Oxygen | 10% |
| Ethanol | 1560 ppm (three times the weight of nitrogen monoxide) |
| Sulfur dioxide | 30 ppm |
| Nitrogen | Balance |
| Water | 10 volume % of the total volume of the above components |

EXAMPLE 2

A first cleaner part coated with 0.52 g of a first catalyst consisting of γ-alumina powder carrying 4 weight % of silver and 0.1 weight % of copper, each based on γ-alumina, was prepared in the same manner as in Example 1. The NOx removing efficiency of the exhaust gas cleaner consisting of the above first cleaner part and the second cleaner part as prepared in Example 1 was measured in the same manner as in Example 1. The results are shown in Table 2.

EXAMPLE 3

A first cleaner part coated with 0.52 g of a first catalyst consisting of silica-alumina powder (silica content: 5 weight %, specific surface area: 350 m$^2$/g) carrying 4.0 weight % of silver chloride and 0.01 weight % of iron, each based on silica-alumina, was prepared in the same manner as in Example 1. The NOx removing efficiency of the exhaust gas cleaner consisting of the above first cleaner part and the second cleaner part as prepared in Example 1 was measured in the same manner as in Example 1. The results are shown in Table 2.

Comparative Example 1

The NOx removing efficiency of the first cleaner part of Example 1 was measured in the same manner as in Example 1. The results are shown in Table 2.

TABLE 2

| | NOx Removing Ratio (%) | | | | | |
| --- | --- | --- | --- | --- | --- | --- |
| | 350° C. | 400° C. | 450° C. | 500° C. | 550° C. | 600° C. |
| Examples | | | | | | |
| 1 | 45 | 68 | 82 | 85 | 84 | 62 |
| 2 | 48 | 70 | 85 | 90 | 84 | 60 |
| 3 | 50 | 75 | 88 | 92 | 83 | 58 |
| Comparative Example | | | | | | |
| 1 | 30 | 45 | 74 | 72 | 70 | 60 |

As seen from Table 2, the combined use (Examples 1 to 3) of the second catalyst (titania) with the first catalyst would appear to improve the NOx removing efficiency as compared with the sole use of the first catalyst (Comparative Example 1).

EXAMPLES 4–6

Into a slurry of commercially available γ-alumina powder specific surface area: 200 m$^2$/g) in deionized water, titanium oxide as added and then stirred for 12 hours. After stirring, the mixture was dried at 70° C., and heated stepwise to 600° C. to be ed at 600° C. to prepare a second catalyst consisting of γ-alumina carrying 1 weight %, based on γ-alumina, of titanium oxide. A second r part coated with 0.26 g of the second catalyst was prepared in me manner as in Example 1.

The same tests as in Examples 1 to 3 were repeated except for using the second cleaner part prepared above. The results are shown in Table 3 along with the results of Comparative Example 1.

TABLE 3

| | NOx Removing Ratio (%) | | | | | |
|---|---|---|---|---|---|---|
| | 350° C. | 400° C. | 450° C. | 500° C. | 550° C. | 600° C. |
| Examples | | | | | | |
| 4 | 48 | 70 | 85 | 85 | 80 | 62 |
| 5 | 50 | 73 | 87 | 88 | 81 | 60 |
| 6 | 52 | 78 | 88 | 90 | 80 | 58 |
| Comparative Example | | | | | | |
| 1 | 30 | 45 | 74 | 72 | 70 | 60 |

As seen from Table 3, the combined use (Examples 4 to 6) of the second catalyst with the first catalyst would appear to improve the NOx removing efficiency as compared with the sole use of the first (Comparative Example 1).

EXAMPLE 7

A first cleaner part coated with 0.52 g of a first catalyst consisting of silica-alumina powder (silica content: 5 weight %, specific surface area: 350 m²/g, average particle size: 0.05 mm) carrying 4.1 weight % of silver based on silica-alumina was prepared in the same manner as in Example 1.

A solution of titanium isopropoxide in 2-propanol was added with water and commercially available silica-alumina powder (silica content: 5 weight %, specific surface area: 350 m²/g, average particle size: 0.05 mm) and stirred to carry titanium on the silica-alumina powder by sol-gel method. The resultant powder was dried at 80° C., heated stepwise to 600° C. and calcined there for 3 hours to obtain silica-alumina powder carrying 3 weight % of titanium oxide. According to the same manner as in preparing the first catalyst of Example 1, copper oxide, lanthanum and cesium were further carried on the silica-alumina powder by using an aqueous solution of copper nitrate and an aqueous solution of lanthanum nitrate and cesium nitrate, thereby obtaining a second catalyst consisting of silica-alumina powder carrying 3 weight % of titanium oxide, 4.4 weight % of copper oxide, 0.3 weight % of lanthanum and 0.3 weight % of cerium, each based on the silica-alumina. Then a second cleaner part coated with 0.26 g of the second catalyst was prepared in the same manner as in Example 1.

The NOx removing efficiency of the exhaust gas cleaner consisting of the first cleaner part and the second cleaner part was measured in the same manner as in Example 1. The results are shown in Table 4.

EXAMPLE 8

A first cleaner part coated with 0.52 g of a first catalyst consisting of γ-alumina powder carrying 4.1 weight % of silver and 0.1 weight % of copper, each based on γ-alumina, was prepared in the same manner as in Example 1.

Separately, a second cleaner part coated with 0.26 g of a second catalyst consisting of silica-alumina powder (silica content: 5 weight %, specific surface area: 350 m²/g, average particle size: 0.05 mm) carrying 3 weight % of zirconium oxide and 4.4 weight % of copper oxide, both based on the silica-alumina, was prepared.

The NOx removing efficiency of the exhaust gas cleaner consisting of the first cleaner part and the second cleaner part was measured in the same manner as in Example 1. The results are shown in Table 4.

EXAMPLE 9

A first cleaner part coated with 0.52 g of a first catalyst consisting of γ-alumina powder carrying 3.0 weight % of silver and 1.5 weight % of iron, each based on γ-alumina, was prepared in the same manner as in Example 1.

A second cleaner part coated with 0.26 g of a second catalyst consisting of γ-alumina powder carrying 2.2 weight % of titanium oxide and 4.5 weight % of copper, each based on γ-alumina, was prepared in the same manner as in Example 7.

The NOx removing efficiency of the exhaust gas cleaner consisting of the first cleaner part and the second cleaner part was measured in the same manner as in Example 1. The results are shown in Table 4.

Comparative Example 2

The NOx removing efficiency of the first cleaner part of Example 7 was measured in the same manner as in Example 1. The results are shown in Table 4.

Comparative Example 3

An alumina-titania mixture was prepared by mechanically mixing γ-alumina powder (specific surface area: 200 m²/g, average particle size: 0.05 mm) and titania powder (specific surface area: 50 m²/g, average particle size: 0.05 mm) in a weight ratio (alumina: titania) of 100:3.7 (alumina: titanium=about 100:2.2). A second cleaner part coated with 0.26 g of a second catalyst consisting of the alumina-titania mixture carrying 4.5 weight % of copper based on the alumina-titania mixture was prepared in the same manner as in Example 1.

The NOx removing efficiency of the exhaust gas cleaner consisting of the first cleaner part of Example 9 and the above second cleaner part was measured in the same manner as in Example 1. The results are shown in Table 4.

TABLE 4

| | NOx Removing Ratio (%) | | | | | |
|---|---|---|---|---|---|---|
| | 350° C. | 400° C. | 450° C. | 500° C. | 550° C. | 600° C. |
| Examples | | | | | | |
| 7 | 42 | 64 | 80 | 85 | 84 | 65 |
| 8 | 45 | 66 | 84 | 88 | 85 | 62 |
| 9 | 46 | 66 | 84 | 90 | 86 | 60 |
| Comparative Example | | | | | | |
| 2 | 26 | 43 | 70 | 68 | 65 | 60 |
| 3 | 24 | 40 | 60 | 55 | 60 | 40 |

As seen from Table 4, the combined use (Examples 7 to 9) of the second catalyst with the first catalyst would appear to improve the NOx removing efficiency in a wide temperature range, in particular, in a low temperature range as compared with the sole use of the first catalyst (Comparative Example 2). Further, from the comparison of Example 9 and Comparative Example 2, it would appear that the NOx removing efficiency is not improved when titanium oxide (titania) is used as a mechanical mixture with another porous inorganic oxide, but improved when titanium oxide is coated on a porous inorganic oxide as the support.

EXAMPLES 10 to 12

Into a homogeneous slurry obtained by stirring for 12 hours a mixture of commercially available γ-alumina powder (specific surface area: 200 m²/g, average particle size: 0.05 mm), deionized water and titanium oxide sol, an aqueous solution of dinitrodiammineplatinum was added.

The resultant mixture was further stirred for 12 hours. After stirring, the mixture was dried at 70° C., heated stepwise to 600° C. and calcined at 600° C. for 3 hours to prepare a second catalyst consisting of γ-alumina carrying 0.6 weight % of titanium oxides and 0.01 weight % of platinum, both based on γ-alumina. A second cleaner part coated with 0.26 g of the second catalyst was prepared in the same manner as in Example 1.

The same tests as in Examples 1 to 3 were repeated except for using the second cleaner part prepared above. The results are shown in Table 5 along with the concentration of carbon monoxide in the effluent exhaust gas. The concentration of carbon monoxide was measured by a CO analyzer.

Comparative Example 4

An alumina-titania mixture was prepared by mechanically mixing γ-alumina powder (specific surface area: 200 m²/g, average particle size: 0.05 mm) and titania powder (specific surface area: 50 m²/g, average particle size: 0.05 mm) in a weight ratio (alumina: titania) of 100:1 (alumina: titanium= about 100:0.6). A second cleaner part coated with 0.26 g of a second catalyst consisting of the alumina-titania mixture carrying 0.01 weight % of platinum based on the alumina-titania mixture was prepared.

The NOx removing efficiency of the exhaust gas cleaner consisting of the first cleaner part of Example 10 and the above second cleaner part was measured in the same manner as in Example 1. The results are shown in Table 5.

TABLE 5

NOx Removing Ratio (%) and CO Concentration (ppm by volume)

|  | 350° C. | 400° C. | 450° C. | 500° C. | 550° C. | 600° C. |
|---|---|---|---|---|---|---|
| NOx Removing Ratio (%) | | | | | | |
| Examples | | | | | | |
| 10 | 45 | 68 | 80 | 84 | 78 | 62 |
| 11 | 48 | 70 | 85 | 86 | 78 | 60 |
| 12 | 50 | 73 | 86 | 88 | 79 | 58 |
| Comparative Example | | | | | | |
| 1 | 30 | 45 | 74 | 72 | 70 | 60 |
| 4 | 30 | 42 | 75 | 70 | 68 | 60 |
| CO Concentration (ppm by volume) | | | | | | |
| Examples | | | | | | |
| 10 | 90 | 400 | 420 | 370 | 180 | 60 |
| 11 | 85 | 350 | 400 | 350 | 150 | 54 |
| 12 | 82 | 340 | 387 | 315 | 140 | 51 |
| Comparative Example | | | | | | |
| 1 | 190 | 640 | 750 | 650 | 600 | 400 |
| 4 | 88 | 400 | 400 | 360 | 170 | 58 |

As seen from Table 5, the combined use (Examples 10 to 12) of the second catalyst with the first catalyst would appear to improve the NOx removing efficiency in a wide temperature range, in particular, in a low temperature range as compared with the sole use of the first catalyst (Comparative Example 1). Further, the combined use of the second catalyst has another advantage to prevent carbon monoxide from being formed.

From the comparison of Example 10 and Comparative Example 4, it would appear that the NOx removing efficiency is not improved when titanium oxide (titania) is used as a mechanical mixture with another porous inorganic oxide, but improved when titanium oxide is carried on a porous inorganic oxide.

What is claimed is:

1. An exhaust gas cleaner for removing nitrogen oxides by reduction from an exhaust gas containing nitrogen oxides, sulfur oxides, moisture, unburned or partially burned components and oxygen, with an oxygen content larger than a stoichiometric amount required for completely oxidizing or burning said unburned or partially burned components, said exhaust gas cleaner consisting essentially of a first-stage catalyst disposed adjacent an exhaust gas inlet side and a second-stage catalyst disposed adjacent said exhaust gas outlet side thereof, said first-stage catalyst consisting essentially of a first porous inorganic oxide carrying at least one silver component selected from the group consisting of silver and silver compounds in an amount of 0.2.–15 weight % based on said first porous inorganic oxide, and at least one transition metal component selected from the group consisting of copper, iron, cobalt, nickel and compounds thereof in amount of 0–2 weight % based on said first porous inorganic oxide; and said second-stage catalyst consisting essentially of a porous titania.

2. The exhaust gas cleaner according to claim 1, wherein a weight ratio of said first-stage catalyst and said second-stage catalyst is 1:10 to 20:1.

3. The exhaust gas cleaner according to claim 1, wherein said silver component is selected from the group consisting of oxides, halides, sulfates and phosphates of silver, and said transition metal component is selected from the group consisting of oxides, halides, sulfates and phosphates of any of copper, iron, cobalt and nickel.

4. The exhaust gas cleaner according to claim 1, wherein said first porous inorganic oxide is alumina or a composite oxide comprising alumina and at least one oxide selected from the group consisting of titania, silica, zirconia, oxides of zinc, oxides of tin, oxides of magnesium, and zeolite.

5. The exhaust gas cleaner according to claim 1, wherein at least one of said first-stage catalyst and said second-stage catalyst is coated on a surface of a cleaner substrate made of ceramic or metal.

6. The exhaust gas cleaner according to claim 1, wherein at least one said first catalyst and said second catalyst is in a form of pellets, granulates, honeycomb, foam or plate.

7. The exhaust gas cleaner according to claim 1, wherein said transition metal component is present in an amount of at least 0.001%.

8. The exhaust gas cleaner according to claim 1, said transition metal component is absent.

9. An exhaust gas cleaner for removing nitrogen oxides by reduction from an exhaust gas containing nitrogen oxides, sulfur oxides, moisture, unburned or partially burned components and oxygen, with an oxygen content larger than a stoichiometric amount required for completely oxidizing or burning said unburned or partially burned components, said exhaust gas cleaner consisting essentially of a first-stage catalyst disposed adjacent an exhaust gas inlet side and second-stage catalyst disposed adjacent an exhaust gas outlet side thereof, said first-stage catalyst consisting essentially of a first porous inorganic oxide carrying at least one silver component selected from the group consisting of silver and silver compounds in an amount of 0.2–15 weight % based on said first porous inorganic oxide, and at least one transition metal component selected from the group consisting of copper, iron, cobalt, nickel and compounds thereof in an amount of 0–2 weight % based on said first porous inorganic oxide, wherein said first porous inorganic oxide is alumina or a composite oxide comprising alumina and at least one oxide selected from the group consisting of titania, silica, zirconia, oxides of zinc, oxides of tin, and zeolite; and said second-stage catalyst consisting essentially of a second porous inorganic oxide carrying at least one titanium component selected from the group consisting of titanium and titanium compounds in an amount of 0.1–50 weight % based on said second porous inorganic oxide, wherein said second porous inorganic oxide is at least one oxide selected from the group consisting of alumina, titania, silica, zirconia, zinc oxides, tin oxides, and zeolite.

10. The exhaust gas cleaner according to claim 9, wherein a weight ratio of said first-stage catalyst and said second-stage catalyst is 1:10 to 20:1.

11. The exhaust gas cleaner according to claim 9, wherein said silver component is selected from the group consisting of oxides, halides, sulfates and phosphates of silver, and said transition metal component is selected from the group consisting of oxides, halides, sulfates and phosphates of any of copper, iron, cobalt and nickel.

12. The exhaust gas cleaner according to claim 9, wherein said second porous inorganic oxide further carries at least one noble metal component selected form the group consisting platinum, palladium, ruthenium, rhodium, iridium and gold in an amount of 0.1 weight % or less based on said second porous inorganic oxide.

13. The exhaust gas cleaner according to claim 9, wherein at least one of said first-stage catalyst and said second-stage catalyst is coated on a surface of a cleaner substrate made of ceramic or metal.

14. The exhaust gas cleaner according to claim 9, wherein at least one of said first catalyst and said second catalyst is in a form of pellets, granulates, honeycomb, foam or plate.

15. The exhaust gas cleaner according to claim 9, wherein said transition metal component is present in an amount of at least 0.001.

16. The exhaust gas cleaner according to claim 9, wherein said transition metal component is absent.

17. The exhaust gas cleaner according to claim 12, wherein said transition metal component is present in an amount of at least 0.001%.

* * * * *